United States Patent [19]

Schulz et al.

[11] Patent Number: 5,375,950
[45] Date of Patent: Dec. 27, 1994

[54] TOOL AND TOOL HOLDER FOR MANUALLY OPERATED TOOLS

[75] Inventors: Reinhard Schulz, Munich; Werner Kleine, Achim-Uesen, both of Germany

[73] Assignee: Hilti Aktiengesellschaft, Furstentum, Liechtenstein

[21] Appl. No.: 90,873

[22] Filed: Jul. 13, 1993

[30] Foreign Application Priority Data

Jul. 17, 1992 [DE] Germany ............... 4223517

[51] Int. Cl.⁵ ............... B23B 51/02; B23B 31/00
[52] U.S. Cl. ............... 408/226; 175/415; 279/19; 408/239 R
[58] Field of Search ............... 408/226, 239 R, 240; 279/19, 19.3, 19.4; 175/395, 415

[56] References Cited

U.S. PATENT DOCUMENTS

| 991,884 | 5/1911 | Osgood | 408/226 |
| 993,395 | 5/1911 | Newbold | 408/226 |
| 2,387,339 | 10/1945 | Meyer | 408/226 |
| 4,006,996 | 2/1977 | Kasabian | 408/226 |
| 4,187,045 | 2/1980 | Fischer | 408/226 |
| 5,174,698 | 12/1992 | Obermeier | 408/226 |

FOREIGN PATENT DOCUMENTS 274373 12/1989 German Dem. Rep. ............ 408/226

Primary Examiner—Daniel W. Howell
Attorney, Agent, or Firm—Anderson Kill Olick & Oshinsky

[57] ABSTRACT

The clamping shank (1) of a chisel-cutting and/or percussion boring tool bits has stop faces effective in the axial direction and in the circumferential direction. Entrainment faces (2), open towards a free end of the clamping shank (1) are located upstream of these stop faces in the direction of the cutting area of the tool bits. The radial dimension (r) of the essentially radially extending entrainment faces (2) is greater than their axial dimension (a). In cooperation with an appropriately designed tool bit receptacle, the entrainment faces (2) can carry such a large share of the torque, that the stop faces are effectively relieved or unloaded.

7 Claims, 1 Drawing Sheet

TOOL AND TOOL HOLDER FOR MANUALLY OPERATED TOOLS

FIELD OF THE INVENTION

The present invention deals with a tool bit for insertion into a tool bit receptacle of manually operated tools serving for chisel-cutting and/or percussion boring.

BACKGROUND OF THE INVENTION

Tool bits for insertion into a tool bit receptacle of manually operated tools comprise stop faces for torque transmittal effective in the circumferential direction, as well as stop faces effective in the axial direction, for axial retention of the tool bits in a tool bit receptacle of the manually operated tools. It is common to dispose the stop faces effective in circumferential direction at entrainment grooves which are open towards the free end of the clamping shank.

Tool bit receptacles provided for the above-mentioned tool bits, comprise a receiving area which usually is equipped with entrainment strips so that appropriate faces matching the stop faces on the tool bit are formed. It is common to provide axially closed grooves at the clamping shank of the tool bits with which matching faces in the tool bit receptacle cooperate which are mostly disposed at radially displaceable locking elements of the tool bit receptacle in order to provide axial retention. It is necessary to shift the locking elements radially out of the axially closed grooves of the tool bits for removing the tool bits out of the tool bit receptacle. Tool bits as well as a tool bit receptacle of this type are disclosed, for instance, in DE-PS 2,551,125.

While the stop faces of the tool bit effective in the axial direction need not meet any particularly large requirements, since they are used only for retaining the tool bits in the tool bit receptacle, the stop faces, effective in the circumferential direction, have to meet stringent demands because of high torque transmittal. Because of these high torques to be transmitted, a corresponding large dimensioning of the stop faces, effective in the circumferential direction is required. Since the dimensional sizing of the clamping shank is limited, the dimensioning of the stop face effective in the circumferential direction is also limited, especially if one has to meet dimensional requirements involving cross-sectional weakening of the clamping shank. All these limiting values in dimensioning of the stop faces effective in the circumferential direction lead to considerable wear of the stop faces effective in the circumferential direction, resulting in a premature failure of the tool bits because of the torques which must be transmitted, especially with tool bits functioning with larger diameters of the cutting area.

DE-OS 38 43 465 discloses a tool bit having projections upstream of the stop faces in the direction of the working area which radially exceed the diameter of the clamping shank. These projections form radially extending entrainment faces. The tool bit chuck or tool bit receptacle, also disclosed in this publication, comprises recesses for the projections so that appropriate matching faces are formed for the entrainment faces.

The projections known from the above publications are configured in such a way that the entrainment faces protrude radially directly from the diameter of the clamping shank and have an extraordinary small radial dimension, compared to their longitudinal extent. This dimensioning of the entrainment faces does not permit carriage of larger torques and thus effectively to unload the stop faces.

It is therefore an object of the present invention to provide a tool and tool holder for manually-operated tools in which the dimensioning of the entrainment faces permits the carriage of larger torques.

Another object of the invention is to provide a strong and efficient tool and tool holder for manually operated tools.

SUMMARY OF THE INVENTION

These and other objects of the invention, which shall become apparent hereafter, are achieved by a tool and tool holder for manually-operated tools for chisel-cutting and/or percussion boring. The apparatus comprises a clamping shank, whose end region, facing away from the working or cutting area of the tool bit, comprises stop faces acting in the axial direction and in the circumferential direction and with entrainment faces open towards the free end of the clamping shank and extending essentially radially, as well as having a diameter larger than the diameter of the clamping shank and located upstream of said stop faces in direction of the cutting area.

An objective of the invention is to create a tool bit which is able to transmit large torques, in cooperation with a suitable tool bit receptacle, without the stop faces effective in the circumferential direction of the clamping shank being subject to excessive wear or resulting in a premature failure. These objectives are achieved by the invention in that the radial dimension of the essentially radially extending entrainment faces is larger than their axial dimension.

The dimensional conditions of the entrainment faces enable a considerably improved type of dimensioning in terms of the torque transmittal. In particular, there exists a possibility of making the entrainment faces ever larger. The diameter effective for the transmittal of torques thus attains an adequate size, so that the entrainment faces can carry such a large share of the torque that the stop faces are effectively relieved or unloaded.

Advantageous dimensional conditions are achieved if the radial dimension of the entrainment faces are 1.2 to 2 times the axial dimension. Preferably, the entrainment faces are part of a profiling which is open towards the free end of the clamping shank. This profiling is configured to be spline-like in an expedient refinement of the invention.

The spline-like profiling can also be considered from the aspect of the annularly-shaped end face so that quasi axially extending claws are formed. These claws can also be utilized similarly to a coupling in connection with an axial displacability of the tool bit, relative to the tool bit receptacle. Thus, there exists also the possibility of limiting the cooperation of the entrainment faces with the matching faces in the tool bit receptacle in a time controlled manner. Thus, only during that period, if, for instance, in adaptation to external influences an axial travel has to be overcome.

This effect can, for instance, be utilized when spot drilling. If in a first phase, only small torques have to be transmitted and larger torques occur only during a second phase when, for instance, the tool bit is cutting with its entire functional or cutting region. Such an application occurs, in particular, with boring crowns where, in a first phase, only the centering portion of the tool bits is used. The crown cutter engages, in its entirety, at the material being machined only in a second phase, resulting in a considerable rise of the torque to be transmitted.

A tool bit, having the entrainment faces arranged according to the invention, may be inserted into a conventional tool bit receptacle. In such an operation, however, only Eke basic function, namely the drive of the tool bit, is assured. One does not, however, make use of the advantages provided in the present invention, so that in such an application, one deals only with, if necessary, a timewise limited transitional solution.

Advantages of the invention are additionally achieved in another embodiment of the invention, in which the tool bit receptacle comprises an external or outer receiving region in the direction of the mouth of the receiving aperture and an inner receiving region, adjacent to the external receiving region, counter to the mouth of the receiving aperture. The inner receiving region comprises matching faces, cooperating in the axial direction and in the circumferential direction, with a stop face of the tool bit and the outer receiving region, comprising matching faces cooperating with the entrainment faces of the tool bit, whose radial dimension is larger than the axial dimension.

The receiving aperture with receiving regions having cross-sections of different sizes and thus configured in a stepped manner, enables the reception of conventional as well as also the reception of tool bits with entrainment faces corresponding to the present invention. Advantages of the present invention are achieved if a tool bit is used, which is matched to the tool bit receptacle, meaning if entrainment faces are provided at the tool bit which cooperate with corresponding matching faces in the tool bit receptacle. Because the radial dimension of the matching faces is larger than their axial dimension, there exists the possibility of transmitting sufficiently large torques to provide sufficient relief or unloading of the matching faces of the inner receiving area of the tool bit receptacle, especially when tool bits having a larger diameter of the cutting region are used. On the one hand, the possibility of larger dimensioning of the matching faces, as well as an increase of the diameter of the matching faces effective for torque transmittal, are decisive in this respect.

Preferably, the matching faces of the external guidance region are part of a profiling open towards the mouth of the receiving aperture, wherein this profiling is configured to be spline like or spline-shaft like. The spline-shaft like design is to be understood in such a way that it extends also across the front end face of the external guidance region of the tool bit receptacle. Thus, when viewed from the end face of the external guidance region, a sort of coupling with axially extending claws is formed. Such a configuration affords, as explained, the possibility of creating an embodiment, in which cooperation of the matching faces of the external guidance region with the entrainment faces of the tool bit, occurs only after overcoming a specific axial travel of the tool bit with respect to the tool bit receptacle. The overcoming of this axial travel can either be basically or timewise limited, for instance, during the time period when a larger torque is being transmitted. This solution is specially useful in tool bits operating in two phases or two steps. This means, for instance with boring crowns, when in a first phase, a centering or spot drill generating small torques is used and, in a second phase, the boring crown comes into play requiring a considerably larger torque.

The radial dimension which is larger than the axial dimension of the entrainment faces of the tool bit, as well as of the matching faces in the tool bit receptacle, leads additionally to manufacturing as well as handling advantages. The advantages in manufacturing lies especially in that the forming tools, for instance by cold extrusion, can be designed in a more optimized manner and therefore are subject to less wear. The handling advantages lie in that the proper engagement positions between tool bit and tool bit receptacle can be found more easily and, in addition to that, travel for creation of a final engagement of the tool bit within the tool bit receptacle can be reduced.

BRIEF DESCRIPTION OF THE DRAWINGS

The invention will be better understood by the Detailed Description of the Preferred Embodiments, with reference to the drawings, of which.

DETAILED DESCRIPTION OF THE PREFERRED EMBODIMENTS

Figure 1:
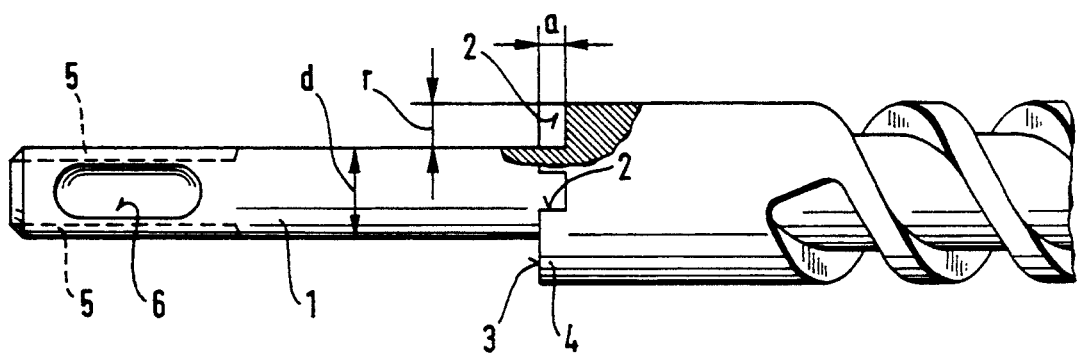
FIG. 1 is a front view of the clamping shank of a tool bit of the invention, partially in cross section.

FIG. 1 depicts a tool bit for insertion into a tool bit receptacle of a manually operated tool. The tool bit comprises a clamping shank 1, whose end region facing away from the cutting area of the tool bit comprises stop faces effective in the axial as well as in the circumferential direction. Entrainment faces 2, open towards the free end of the clamping shank 1 and extending essentially radially as well as projecting beyond the diameter of the clamping shank, are located upstream of these stop faces in direction of the working area.

The radial dimension r, of the essentially radially extending entrainment faces 2, is greater than their axial dimension a. The entrainment faces 2 are a part of a profiling open towards the free end of the clamping shank which, when viewed from the angularly shaped end face 3, forms axially extending claws 4. These claws 4 can be used as a sort of coupling during axial displacement of the tool bit with respect to the tool bit receptacle.

The stop faces, effective in axial and the circumferencial directions, are formed by two rotary entrainment grooves 5, open axially towards the free end of the clamping shank 1, and by two axially closed locking grooves 6.

Figure 2:
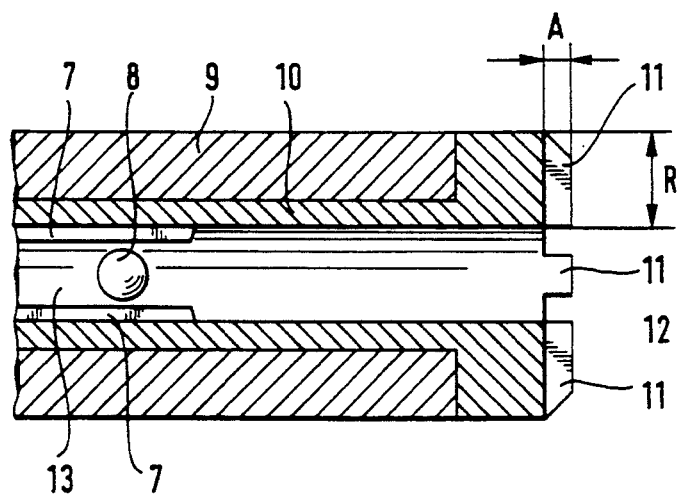
FIG. 2 is a cross-sectional view through a tool bit receptacle for the clamping shank of FIG. 1.

A tool bit receptacle is diagrammatically shown in FIG. 2, with an outer receiving region 12 in direction of the mouth of the receiving aperture and an inner receiving region 13, adjacent to the outer receiving region 12, counter to the mouth of the receiving apparatus. The inner receiving region 13, comprises matching faces, which co-operate in circumferencial direction with the stop faces of the tool bit.

The matching faces, cooperating in the circumferencial direction with the stop faces of the tool bit, are formed by entrainment strips 7. Locking elements 8, which are shiftable radially in the circumferential direction or in the axial direction when the actuation sleeve 9 is displaced, form the matching faces which cooperate with the locking grooves 6 of the clamping shank 1.

The tool bit receptacle has a guidance 10 with radial through aperatures (not shown here), in which the locking elements 8 are guided. By displacing the actuation sleeve 9 either axially or in the circumferencial direction, recesses in the axial sleeve 9 (not shown in this example) can be made to register with locking elements 8, so that the locking elements 8 shown to be a ball in FIG. 2, can shift out of the locking grooves 6, thus releasing the clamping shank 1 so that the tool bit can be removed from the guidance 10 and thus out of the tool bit receptacle.

An outer receiving region 12, comprises matching faces whose radial dimension R is larger than their axial dimension A and which cooperate with the entrainment faces 2 on the tool bit. The matching faces of the outer receiving region 12 are part of a splined-shaft like profiling, open towards the mouth of the receiving aperture. The profiling extends across the free end face of the outer receiving region 12 of the tool bit receptacle. Viewed from the end face of the outer receiving region 12, that profiling forms axially extending claws 11 similar to a type of coupling.

In order to assure a lasting engagement of the claws 4, 11, roller shaped elements can also be used as locking elements. These cause smaller axial displacement of the tool bit when operating the hand held tool.

While the preferred embodiment of the invention have been described in detail, modifications and adaptations may be made thereto, without departing from the spirit and scope of the invention, as delineated in the following claims.

What is claimed is:

1. A tool bit for insertion into a tool bit receptacle of manually operated tools for chisel-cutting and/or percussion boring having a cutting region comprising:

an engagement shank (1) having a diameter and an end region facing away from the cutting region of the tool bit;

stop faces effective in axial and in circumferential directions;

entrainment faces (2) having a radial dimension and an axial dimension open toward a free end of the clamping shank (1) have a diameter greater than the clamping shank (1) and extend essentially radially and upstream of said stop faces in the direction of the cutting region; and wherein the radial dimension (r) of the entrainment faces (2) is larger than the axial dimension (a) thereof.

2. The tool bit of claim 1, wherein the radial dimension (r) is approximately 1.2 to 2 times the axial dimension (a).

3. The tool bit of claim 2, wherein the entrainment faces (2) are part of profiling open toward the free end of the clamping shank (1).

4. The tool bit of claim 3, wherein the profiling is designed to be spline-shaft like.

5. A tool receptacle for receiving a tool bit of manually operated tools for chisel-cutting and/or percussion boring, comprising:

an outer region (12) in a direction of a mouth of a receiving aperture having an axial direction and a circumferential direction;

an inner receiving region (13) adjacent to the outer receiving region (12), counter to the mouth of the receiving aperture, wherein the inner receiving region (13) comprises matching faces, cooperating in the axial direction and in the circumferential direction with stop faces on the tool bit, and wherein the outer receiving region (12) comprises matching faces cooperating with entrainment faces (2) on the tool bit; and wherein radial dimension (R) of the matching faces is larger than axial dimension (A) thereof.

6. The tool bit receptacle of claim 5, wherein the matching faces of the outer receiving region (12) are part of a profiling open towards the mouth of the receiving aperture.

7. The tool bit receptacle of claim 6, wherein the profiling is designed to be similar to a splined shaft.

* * * * *